US012061746B2

(12) United States Patent
Cheng et al.

(10) Patent No.: US 12,061,746 B2
(45) Date of Patent: Aug. 13, 2024

(54) INTERACTIVE SIMULATION SYSTEM WITH STEREOSCOPIC IMAGE AND METHOD FOR OPERATING THE SAME

(71) Applicant: Lixel Inc., Taipei (TW)

(72) Inventors: Yung-Cheng Cheng, Hsinchu (TW); Chun-Hsiang Yang, Hsinchu (TW)

(73) Assignee: Lixel Inc., Taipei (TW)

( * ) Notice: Subject to any disclaimer, the term of this patent is extended or adjusted under 35 U.S.C. 154(b) by 0 days.

(21) Appl. No.: 18/169,848

(22) Filed: Feb. 15, 2023

(65) Prior Publication Data

US 2024/0143083 A1 May 2, 2024

(30) Foreign Application Priority Data

Oct. 26, 2022 (TW) ................... 111140541

(51) Int. Cl.
| | |
|---|---|
| *G06F 3/01* | (2006.01) |
| *G06F 3/0346* | (2013.01) |
| *G06F 3/04815* | (2022.01) |
| *G06F 3/04845* | (2022.01) |
| *H04N 13/275* | (2018.01) |
| *H04N 13/398* | (2018.01) |

(Continued)

(52) U.S. Cl.
CPC .............. *G06F 3/017* (2013.01); *G06F 3/011* (2013.01); *G06F 3/013* (2013.01); *G06F 3/016* (2013.01); *G06F 3/0346* (2013.01); *G06F 3/04815* (2013.01); *G06F 3/04845* (2013.01); *H04N 13/275* (2018.05); *H04N 13/398* (2018.05); *G09B 5/065* (2013.01); *G09B 19/24* (2013.01)

(58) Field of Classification Search
CPC .......... G06F 3/011; G06F 3/016; G06F 3/017; G06F 3/013; G06F 3/0346; G06F 3/04815; G06F 3/04845; H04N 13/275; H04N 13/398; G09B 5/065; G09B 19/24
USPC ........................................................ 345/156
See application file for complete search history.

(56) References Cited

U.S. PATENT DOCUMENTS

| | | | | |
|---|---|---|---|---|
| 10,987,176 | B2 * | 4/2021 | Poltaretskyi | A61B 5/1122 |
| 2012/0162204 | A1 * | 6/2012 | Vesely | G06F 3/0325 |
| | | | | 345/419 |

(Continued)

FOREIGN PATENT DOCUMENTS

| | | |
|---|---|---|
| CN | 111329554 A | 6/2020 |
| CN | 111880648 A | 11/2020 |

(Continued)

*Primary Examiner* — Jason M Mandeville
(74) *Attorney, Agent, or Firm* — Li & Cai Intellectual Property Office

(57) ABSTRACT

An interactive simulation system with a stereoscopic image and a method for operating the system are provided. The system includes a three-dimensional display and a control host. The stereoscopic image display is used to display a stereoscopic image. The system includes an interactive sensor that is used to sense gesture of a user or an action that the user manipulates a haptic device so as to produce sensing data. In the meantime, the system detects eye positions of the user. The changes of coordinates with respect to the gesture or the haptic device can be determined and referred to for forming a manipulation track. An interactive instruction can be determined. The stereoscopic image can be updated according to the interactive instruction and the eye positions of the user.

18 Claims, 10 Drawing Sheets

(51) Int. Cl.
*G09B 5/06* (2006.01)
*G09B 19/24* (2006.01)

(56) References Cited

U.S. PATENT DOCUMENTS

| | | | |
|---|---|---|---|
| 2014/0225887 A1* | 8/2014 | Aguirre-Valencia | ........................ H04N 13/279 345/419 |
| 2017/0202624 A1* | 7/2017 | Atarot | .................... G16H 40/63 |
| 2022/0104884 A1* | 4/2022 | Leiderman | ....... A61B 1/000095 |

FOREIGN PATENT DOCUMENTS

| CN | 111949131 A | 11/2020 |
|---|---|---|
| CN | 113508354 A | 10/2021 |

* cited by examiner

INTERACTIVE SIMULATION SYSTEM WITH STEREOSCOPIC IMAGE AND METHOD FOR OPERATING THE SAME

CROSS-REFERENCE TO RELATED PATENT APPLICATION

This application claims the benefit of priority to Taiwan Patent Application No. 111140541, filed on Oct. 26, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a stereoscopic image interactive simulation technology, and more particularly to an interactive simulation system that allows a user to perform gestures or a haptic device upon a floating stereoscopic image and a method for operating the interactive simulation system.

BACKGROUND OF THE DISCLOSURE

In the conventional technology, there is already use of an image simulation technology to simulate a teaching program. A user can often be seen using a display to conduct learning simulation by displayed images. The display can be, for example, a head-mounted display that displays a virtual reality content, so that the user can see virtual reality images operated by another person.

Furthermore, a robotic device can be provided to the user for performing gestures on a virtual stereoscopic image. The robotic device uploads data generated during operation to a server or a computer host, so as assess a teaching performance.

In another approach, a stereoscopic image is displayed by a specific display, and the user can manipulate a specific apparatus upon this stereoscopic image. The apparatus can be a device that is used to simulate a surgery. A sensor is used to sense an operating behavior of the user, and sensor data generated thereby can also be used as a basis for assessing performance of the user during manipulation of the apparatus.

SUMMARY OF THE DISCLOSURE

In response to the above-referenced technical inadequacies, the present disclosure provides an interactive simulation system with a stereoscopic image and a method for operating the same.

Compared with the various simulative learning approaches in the conventional technologies, the present disclosure is related to an interactive simulation system with a stereoscopic image and a method for operating the same. The interactive simulation system provides a stereoscopic image display that is used to display a stereoscopic image. The interactive simulation system includes an interactive sensor that is used to sense a gesture of a user or an action generated by manipulating a haptic device. The interactive simulation system provides a control host that can be built in or externally connected with the stereoscopic image display. The control host is used to interpret the gesture of the user or the action that the user manipulates the haptic device for generating an interactive instruction operated on the stereoscopic image.

When the interactive simulation system with a stereoscopic image is in operation, the stereoscopic image display displays the stereoscopic image and the interactive sensor generates sensing data by sensing the gesture or the action generated by manipulating the haptic device on the stereoscopic image. The changes of coordinates of the gesture or the action performed by the haptic device can be determined. The changes of coordinates are referred to for forming a manipulation track that is used to determine an interactive instruction. The interactive instruction acts as a basis to update the stereoscopic image.

In an aspect, the interactive sensor includes a gesture sensor that is used to sense the gesture performed by the user or the action generated by manipulating the haptic device. The sensing data generated by the gesture sensor refers to three-dimensional coordinate variations. The interactive instruction is formed when the control host processes the changes of the three-dimensional coordinates.

In another aspect, the haptic device includes a built-in action sensor that generates the sensing data indicative of changes of three-dimensional coordinates of the haptic device in a stereoscopic space. The interactive instruction can also be generated by the control host.

In one further aspect, the interactive sensor includes an eye detector. When the eye detector is turned on to start to detect the eye positions of the user, the stereoscopic image display updates the stereoscopic image to be displayed according to the eye positions in real time. The definition of the stereoscopic image being updated when the eye detector is turned off is higher than the definition of the stereoscopic image being updated when the eye detector is turned off.

Furthermore, an eye-tracking technology is adopted to detect eye position of the user. The eye-tracking technology can also obtain the three-dimensional coordinates, a viewing angle range and a moving speed of the user's eyes. The above information generated by the eye-tracking technology can be combined with the gesture or the action performed through the haptic device for generating a manipulation track. A contour of the user's hand or the haptic device can also be obtained in order to render the stereoscopic image.

Still further, when the user performs the gesture or manipulates the haptic device on the stereoscopic image, the gesture or the action generated by manipulating the haptic device is used to determine if any risk is present according to a predetermined risk threshold. It should be noted that the properties of an object to be displayed as the stereoscopic image are used to form attributes of a stereoscopic model that is referred to for setting up the risk threshold.

Still further, the database records the stereoscopic image data, the annotation correlated to the stereoscopic image, and the content and a spatial position of the annotation.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
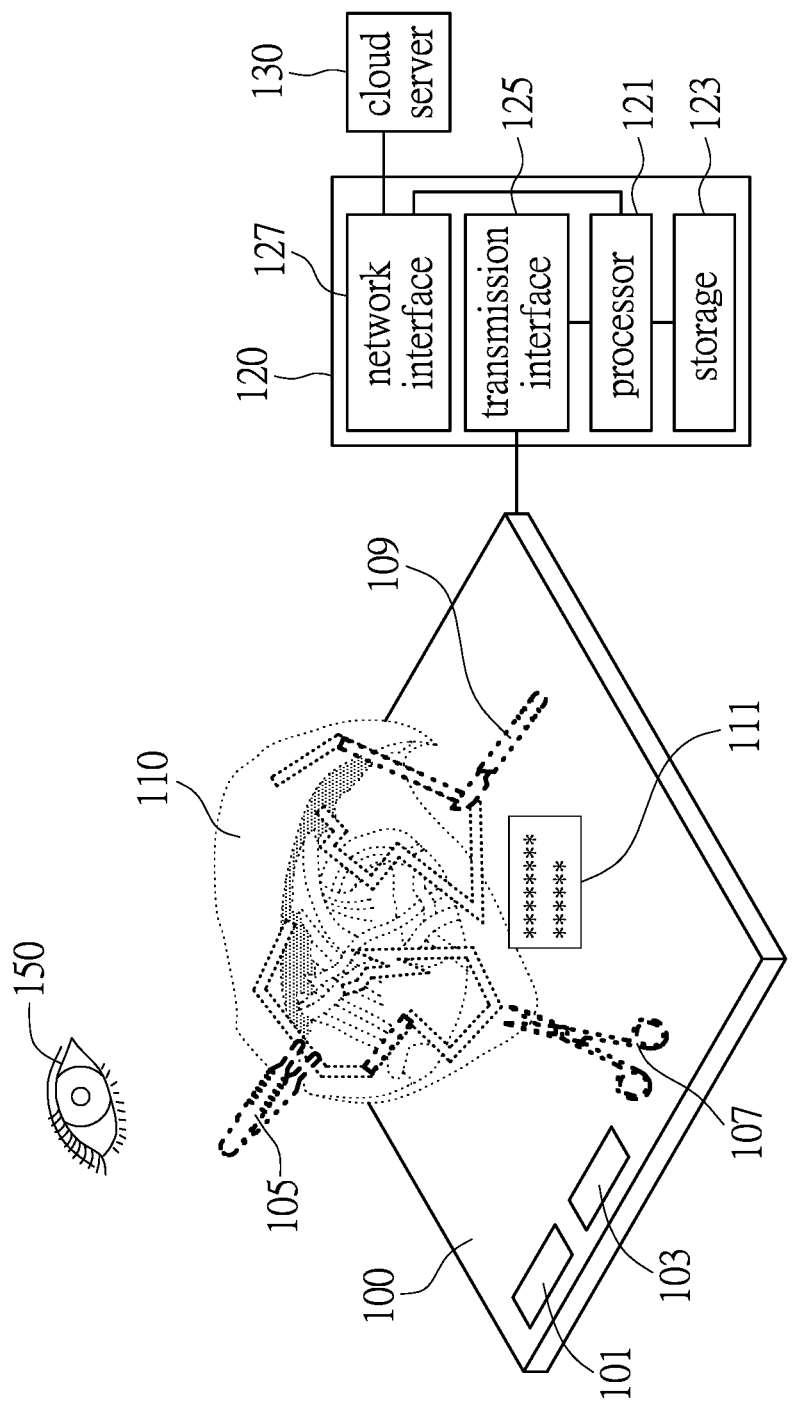
FIG. 1 is a schematic diagram that illustrates an interactive simulation system with a stereoscopic image according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure relates to an interactive simulation system with a stereoscopic image and an operating method thereof. The interactive simulation system that is implemented by a stereoscopic display technology and an interactive technology allowing a user to manipulate the stereoscopic image with gesture is provided. The interactive simulation can be applied to applications such as teaching simulation and virtual interaction.

Reference is made to FIG. 1, which is a schematic diagram illustrating the interactive simulation system with a stereoscopic image in one embodiment of the present disclosure. A stereoscopic image display 100 is provided in the system. According to one of the embodiments of the present disclosure, the stereoscopic image display 100 essentially consists of an optical element layer, a display panel and a backlight module. The optical element layer is formed of a lens array. The display panel can be a liquid crystal display panel that is disposed between the optical element layer and the backlight module. The display having the display panel can also be other types of displays having the backlight module, or an organic LED display with self-luminous properties. The stereoscopic image display 100 includes an image processor that can be used to process the display content and a communication element that is capable of retrieving stereoscopic image data from an external source. The stereoscopic image data can be processed to render an initial image provided to the display panel. The initial image can be focused and projected onto the stereoscopic image display 100 via the optical element layer. A stereoscopic image 110 such as a floating stereoscopic image is therefore formed.

According to one embodiment of the stereoscopic image display 100, in addition to the above-mentioned components, for implementing the teaching simulation and allowing the user to perform interactive manipulation, the stereoscopic image display 100 provides an interactive sensor such as a gesture sensor 101. The gesture sensor 101 uses an optical detection technology or an image processing method to detect the gesture that the user performs to manually manipulate the stereoscopic image 110 or the gesture that is made by manipulating various haptic devices 105, 107 and 109. In a practical example, the quantity of the haptic devices 105, 107 and 109 is not limited to the example shown in the figures. The quantity of the haptic devices 105, 107 and 109 that can operate simultaneously is determined based on a capability of data processing of the interactive simulation system so that the system can simultaneously process the sensing data generated by one or more haptic devices can 105, 107 and 109.

Further, the gesture sensor 101 can be used to sense the gesture of the user or the action performed through the one or more haptic devices 105, 107 and 109. The sensing data generated by the gesture sensor 101 refers to three-dimensional coordinate variations so as to generate an interactive instruction by a control host 120. According to one embodiment of the present disclosure, when the user manipulates the haptic devices 105, 107 and 109 to act on the stereoscopic image 110, an action sensor in each of the haptic devices 105, 107 and 109 is used to generate sensing data that refers to three-dimensional coordinate variations in a stereoscopic space, and a receiver disposed in the stereoscopic image display 100 receives signals of the actions performed by the haptic devices 105, 107 and 109. It should be noted that the action sensor can be an accelerometer or a gyroscope built in the haptic device. The control host 120 processes the sensing data that is formed into an interactive instruction.

Still further, the interactive simulation system includes an eye detector 103 that is implemented by collaboration of hardware and software. The eye detector 103 is disposed above the stereoscopic image display 100. The eye detector 103 acquires an image of the user's face including an eye 150 by a sensor. The image is then processed by a software means so as to determine a position of the user's face according to the features of the image. The position of the eye 150 can be detected based on the features of the eyes. The position of the eye 150 may indicate the position of one or two eyes of the user. A set of coordinates can be used to describe the position of the eye 150, and the coordinates are transformed to the coordinates at the same coordinate system with the stereoscopic image display 100.

It should be noted that the eye detector 103 can be turned on or off. According to one embodiment of the interactive simulation system having the eye detector 103, the interactive simulation system can drive the stereoscopic image display 100 to project an image onto the position of the eye according to the position of the eye when the eye detector 103 is turned on. Further, the stereoscopic image being projected onto the position of the eye can be updated in real time according to the position of the eye. Accordingly, the user can see a stereoscopic image with a higher resolution than the image being rendered when the eye detector 103 is turned off. Hence, when the eye detector 103 is turned off, the interactive simulation system displays a stereoscopic image with a lower resolution since the system does not need to show the stereoscopic image according to the position of the eye.

According to the above description of the embodiment, the interactive simulation system displays the stereoscopic image 110 via the stereoscopic image display 100 according to the position of the eye 150 detected by the eye detector 103. The stereoscopic image display 100 can use the gesture sensor 101 to determine the gesture performed by the user or the action generated by manipulating the haptic devices 105, 107 and 109 so as to display the stereoscopic image 110 in response to the gesture or the action. The stereoscopic image 110 that responds to the gesture or the action achieves a purpose of teaching simulation and virtual interaction. For enhancing the effect of teaching simulation, not only is the position of the eye 150 referred to for updating the stereoscopic image 110, but an annotation 111 can also be appended to the stereoscopic image 110 for reference.

More particularly, one of the objectives of the interactive simulation system is to provide a control mechanism to control the circuits and software operated in the system so as to translate the gesture performed by the user or the action generated by manipulating the haptic devices 105, 107 and 109 into an interactive instruction applied to the stereoscopic image 110. In one of the embodiments of the present disclosure, the control mechanism can be a control host 120 implemented by software and hardware of a computer system. The control host 120 includes a processor 121 and storage 123. The control host 120 can be an external device that is connected with the stereoscopic image display 100 via a transmission interface 125. The transmission interface 125 can be an industry-standard connection. In one further embodiment, the control host 120 can be built in the stereoscopic image display 100, or connected with the stereoscopic image display 100 via a specific internal connection. The control host generates the interactive instruction. The control host 120 is used to control and process the image displayed by the stereoscopic image display 100. The control host 20 transmits the instructions and the image data via the transmission interface 125. The storage 123 acts as a database of the control host 120. The storage 123 is used to store the stereoscopic image data. The stereoscopic image display 100 can be used to display the stereoscopic image 110, mark the annotation 111 and provide the stereoscopic image 110 that responds to the gesture.

According to one of the embodiments of the present disclosure, the control host 120 is a computer system that serves at a local site. The control host 120 connects with and is configured to control one or more local stereoscopic image displays 100 via the transmission interface 125. The control host 120 also provides the stereoscopic image data. On the other hand, the interactive simulation system provides a cloud server 130. The one or more control hosts 120 can connect with the cloud server 130 via a network interface 127. The cloud server 130 provides the one or more control hosts 120 at different locations the computation and database services.

Further, in one of the embodiments, when the interactive simulation system provides a surgical teaching simulation service, the stereoscopic image 110 simulates a three-dimensional human organ image. The interactive simulation system not only allows the user to perform gestures on the stereoscopic image 110, but also manipulates the haptic device 105, 107 and 109 over the stereoscopic image 110. A sensor built in the haptic device 105, 107 and 109 or an external sensor such as the above-mentioned gesture sensor 101 is used to sense actions performed by the haptic device 105, 107 and 109. The interactive simulation system relies on the control host 120 to derive the interactive instruction in response to a gesture or an action generated by manipulating the haptic devices 105, 107 and 109. The interactive instruction is such as minifying, magnifying, moving or rotating instruction performing on the stereoscopic image. The interactive simulation system can update the stereoscopic image 110 according to the interactive instruction.

In one further embodiment of the present disclosure, for forming a feedback message with respect to the interactive instruction, the stereoscopic image display 100 updates the stereoscopic image according to the interactive instruction. The stereoscopic image display 100 generates voice feedback or vibration feedback that is generated by the haptic devices 105, 107 and 109 according to the various interactive instructions. For example, the stereoscopic image can be updated to be a series of continuous stereoscopic images that gradually decrease in size according to a minification interactive instruction. The updated stereoscopic image is rotated according to a rotation interactive instruction. For the haptic device piercing into the stereoscopic image, a vibrator in the haptic device generates vibration feedback that reflects the piercing action. A sound may be generated to respond to an interactive instruction according to a gesture performed by a user or motion performed by a haptic device.

Further, the eye detector 103 can be disposed in the stereoscopic image display 100 and can also be an external device that is used to detect the position of the eye 150. Therefore, the interactive simulation system determines an appropriate display angle of the stereoscopic image 110 according to the position of the eye 150. The stereoscopic image 110 can be updated according to the position of the eye 150.

According to one embodiment of the present disclosure, the stereoscopic image 110 can be stored in a memory of the stereoscopic image display 100 or in a control host 120. The stereoscopic image 110 can be loaded to storage 123 of the control host 120 from a cloud server 130, or from the memory of the stereoscopic image display 100. The stereoscopic image 110 can be updated according to the interactive instruction or the position of the eye 150.

Figure 2:
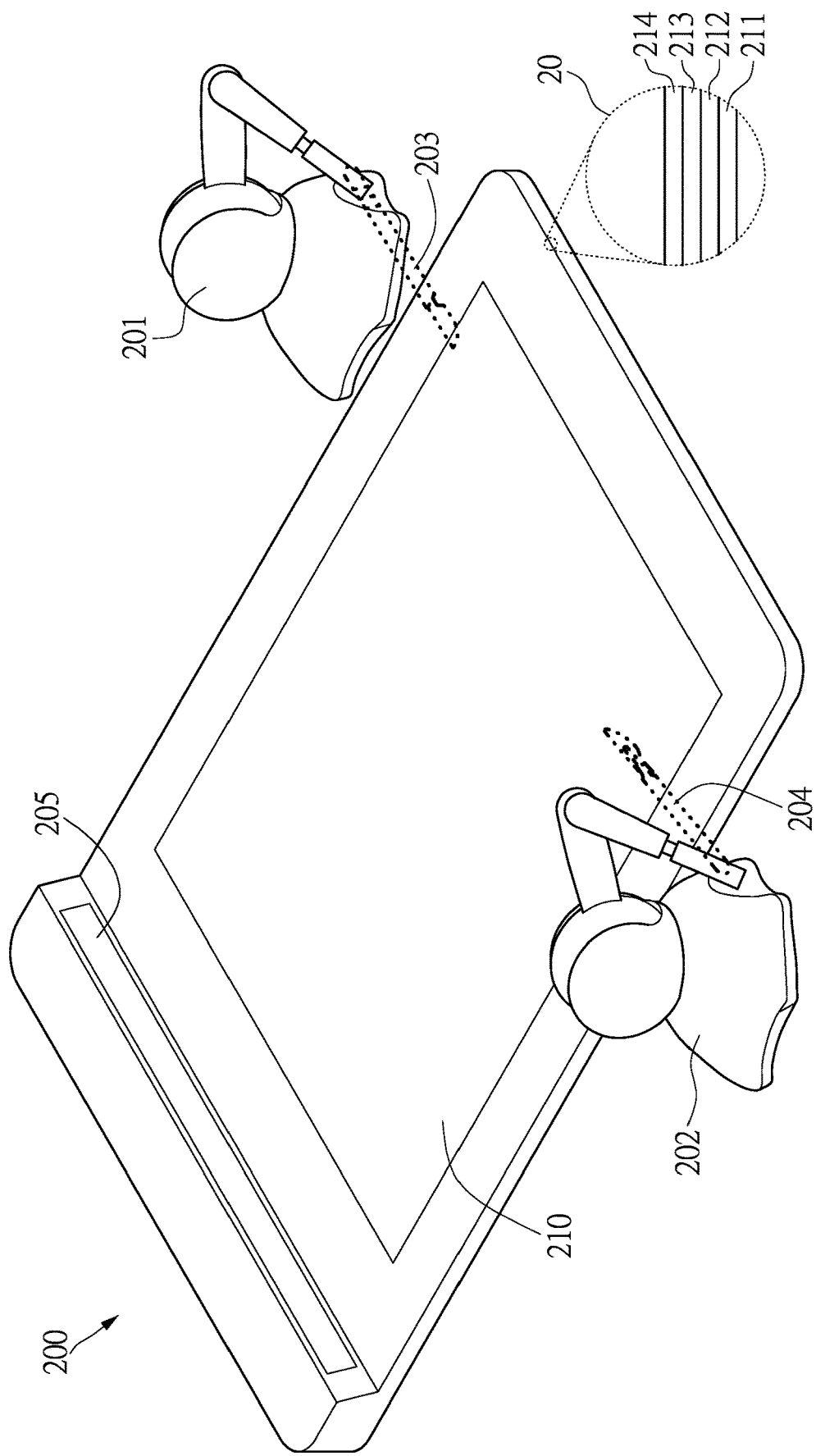
FIG. 2 is a schematic diagram that illustrates a stereoscopic image display according to one embodiment of the present disclosure.

FIG. 2 is a schematic diagram depicting a stereoscopic image display according to one embodiment of the present disclosure. A stereoscopic image display 200 shown in the diagram has a sensor 205 on its side that integrates the gesture sensor 101 and the eye detector 103 of FIG. 1. The main structure of the stereoscopic image display 200 includes a display panel 210 that is capable of displaying a floating stereoscopic image at a distance above the surface of the display panel 210.

It should be noted that, according to one embodiment, the structure 20 of the stereoscopic image display 200 mainly includes a backlight module 211, a liquid crystal display panel (LCD) 212, a lens array layer 213 and an optical layer 214 that is configured to be a specific function. An LED display can be used to replace the backlight module 211 and the liquid crystal display panel 212. The lens array layer 213 is composed of lenses that are arranged vertically and horizontally. The liquid crystal display panel 212 can display interlaced unit images that can be projected to a position above the stereoscopic image display 200 through different lenses according to a display scenario, e.g., a detection result of the eye detector. The optical layer 214 can be designed to be with a specific optical property, e.g., an off-axis optical structure. For example, the optical layer 214 can be composed of a plurality of microprisms that are arranged in an array. The microprism can turn a light that passes through the lens array layer 213 at an angle for a user to see the stereoscopic image.

In one of the embodiments of the present disclosure, the stereoscopic image display 200 can simulate various operational interfaces and tools by means of software. Various operational interfaces can be used to operate the display functions of the stereoscopic image display 200. The operational interface can be a user interface that is designed for the user to select one of the haptic devices. The haptic devices based on their types can be roughly categorized into knives, scissors with double handles, and fixtures having two handles. Each of the types of the haptic devices has its own behavior and feedbacks.

According to one embodiment of the stereoscopic image display 200, the user-held haptic devices are provided at two sides of the display 200. For example, a first haptic device 201 and a second haptic device 202 are provided. Besides the sensor 205 is used to sense the gesture of the user, the two hands of the user can respectively hold a first handheld device 203 of a first haptic device 201 and a second handheld device 204 of a second haptic device 202 for manipulating a stereoscopic image. In an aspect of the present disclosure, a link lever between the first haptic device 201 and the second haptic device 202, a motor and a circuit that is used to sense the motion of joints in the haptic devices can be used to sense the action generated by the user who manipulates the first handheld device 203 and the second handheld device 204.

When the interactive simulation system is in operation, the two hands of the user can respectively hold the first haptic device 201 and the second haptic device 202 to perform the action on the stereoscopic image, a back-end control host can sense the gesture performed by the user who uses the first haptic device 201 and the second haptic device 202. When mapping to the three-dimensional coordinates of the stereoscopic image and referring to the attributes of the content of the stereoscopic image, a feedback can be transmitted to the two hands of the user through the motor and mechanical structure of the first haptic device 201 and the second haptic device 202. The user can therefore feel the haptic feedback so that the interactive simulation can be implemented.

It is worth noting that, in contrast to the conventional technology that requires an auxiliary device such as a virtual reality (VR) device or an augmented reality (AR) device to display the stereoscopic image, and the conventional technology using lenticular lenses to show a bare-eyed stereoscopic image, the interactive simulation system of the present disclosure adopts a light-field display that allows the user to directly see a real image of the stereoscopic image being projected at a specific viewing angle via an optical layer 214 by a light-field display technology. It should be noted that the light-field display technology is a display technology that simulates human visual imaging principle. For a specific object, e.g., the original substance of the stereoscopic image, a light-field camera collects the information of lights reflected by the object in a specific circumstance. Afterwards, an algorithm can restore the lights reflected by the object by calculating the information of the reflected lights. The information of the lights includes colors, brightness, direction, position and depth. The reflected light projected by the stereoscopic image display to the eyes of the user can retain complete light information of the object.

When the system provides the stereoscopic image and the updated stereoscopic image after the interaction, the feedback that integrates visual and haptic feedbacks for the stereoscopic image. In practice, the interaction performed on the stereoscopic image can be classified into a simulation interaction and a logical interaction. The simulation interaction indicates that the system learns the user's behaviors by tracking his eyes, hands and the actions of the haptic devices so as to update the stereoscopic image as compared with the current stereoscopic image. With a stereoscopic image of a human organ as an example, the updated stereoscopic image can show the movement, deformation, breakdown and separation of the organ. The logical interaction indicates that the system provides a risk management and control mechanism to prompt the user when engaging in any dangerous action that crosses a boundary based on a well-defined forbidden zone.

Figure 3:
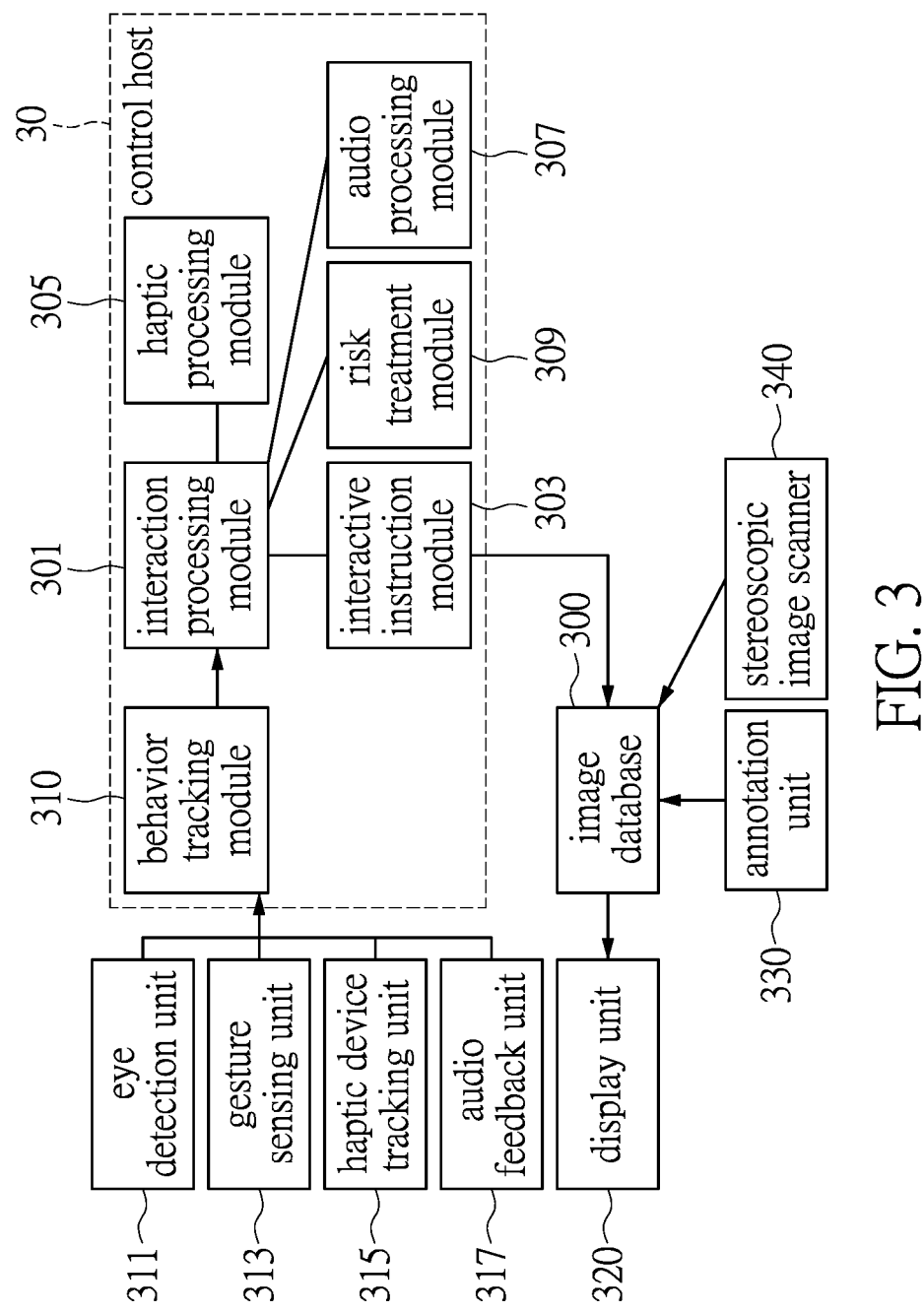
FIG. 3 is a schematic diagram illustrating the interactive simulation system that is implemented by collaboration of hardware and software according to one embodiment of the present disclosure.

FIG. 3 is a schematic diagram depicting an interactive simulation system that is implemented by collaboration between hardware and software according to one embodiment of the present disclosure. The interactive simulation system relies on a control host 30 to control a stereoscopic image display to operate. For example, an interaction processing module 301 that is implemented by circuits and software is electrically connected with the circuits and software modules that are used to process the various signals in the control host 30. The stereoscopic image display includes an eye detection unit 311, a gesture sensing unit 313, a haptic device tracking unit 315, an audio feedback unit 317 and a display unit 320.

According to the schematic diagram, the stereoscopic image used in the interactive simulation system can be produced by a stereoscopic image drawing technology. For the purpose of teaching simulation, the stereoscopic image can be produced by scanning a specific object (e.g., a human body and an internal organ) with a stereoscopic image scanner 340. When the stereoscopic image data is generated, the data is stored to an image database 300. Each of the stereoscopic image data in the image database 300 is assigned with an identification index, a code and searchable information. For an educational purpose, an annotation unit 330 is used to add an annotation to a specific part of the stereoscopic image. Every annotation has its own correlation information that is created by a database technology for correlating with the stereoscopic image data in the image database 300. The annotation can also be appended to a three-dimensional coordinates of the stereoscopic image. A display unit 320 is used to display the stereoscopic image with the correlated annotation.

It should be noted that the annotation unit 330 is used to record the user-specified three-dimensional coordinates of the stereoscopic image and the content of the annotation. The user can perform gesture or the use the haptic device to annotate the stereoscopic image. The system relies on an interactive sensor (e.g., the gesture sensor or the sensor built in the haptic device) to detect the content and the position of the annotation, and then completes the annotation by the annotation unit 330. The correlation between the annotation and the stereoscopic image data can be established. The content of the annotation and the spatial position can be stored to the image database 300 with the stereoscopic image.

The stereoscopic image display can internally or externally connect with the interactive sensor. The interactive sensor can be the gesture sensing unit 313 that is used to sense the gesture by optical or image recognition technology, the haptic device tracking unit 315 that is used to track the action performed on the stereoscopic image with the haptic device and to form a track, the audio feedback unit 317 that is used to receive the voice of the user (e.g., a teacher) in a present scene, and the eye detection unit 311 that is used to detect the eye positions of the user. Thus, when the interactive simulation system uses the stereoscopic image display to display the stereoscopic image, and acquires the gesture performed on the stereoscopic image, the action generated by manipulating the haptic device, the audio and the position of the eye by the various interactive sensors. After that, the hardware and the software of the control host 30 can collaboratively implement the functional modules for calculating an interactive instruction. The stereoscopic image can be updated according to the interactive instruction so as to reflect the posture of the updated stereoscopic image.

The control host 30 includes a behavior tracking module 310 that calculates the gesture of the user or the continuous actions performed by the haptic device based on the sensing data provided by the stereoscopic image display. The sensing data is used to illustrate a track and the interaction processing module 301 generates the interactive instruction by processing the above data. The interactive instruction reflects a gesture of minification, magnification, movement or rotation. The interactive instruction can also correspond to the more complex behaviors performed by the haptic device that can simulate a blade, pliers, scissors, and a needle for medical use.

Further, the control host 30 includes a haptic processing module 305 that is used to process an action performed by the user with the various haptic devices. The haptic processing module 305 can continuously record three-dimensional coordinates according to action performed through the haptic device. The interaction processing module 301 then generates an interactive instruction. The audio processing module 307 can process the audio received from the audio feedback unit 317, and the interaction processing module 301 that performs audio recognition so as to generate the interactive instruction.

Still further, the control host 30 includes a risk treatment module 309. In a specific application, when the user performs a gesture or manipulates the haptic device on the stereoscopic image, the risk treatment module 309 determines if the gesture or the action performed through the haptic device meets any risk according to a predetermined risk threshold. For example, the interactive simulation system can be applied to teaching simulation in surgery. The stereoscopic image display displays a stereoscopic image of a human organ. Some risk thresholds with respect to the human organ can be predetermined in the system. The risk thresholds are then applied to the stereoscopic image data. The system relies on the risk thresholds to assess the risk of the gesture or the action of the haptic device performed on the stereoscopic image. The system can therefore determine whether the action performed by the user with the haptic device may harm the human organ. For example, the system can issue a warning signal such as a voice or a sound effect, or a vibration if the user unduly manipulates the haptic device so as to harm the human organ. Therefore, the risk treatment module 309 can effectively assess the risk for achieving a learning purpose when a learner performs a gesture on the stereoscopic image or uses the haptic device to manipulate the stereoscopic image.

When the above-mentioned functional modules generate the interactive instruction, the system can acquire the stereoscopic image data from the image database 300 in response to the interactive instruction by the interactive instruction module 303 of the control host 30, and uses the display unit 320 to display the updated stereoscopic image instantly.

Figure 4:
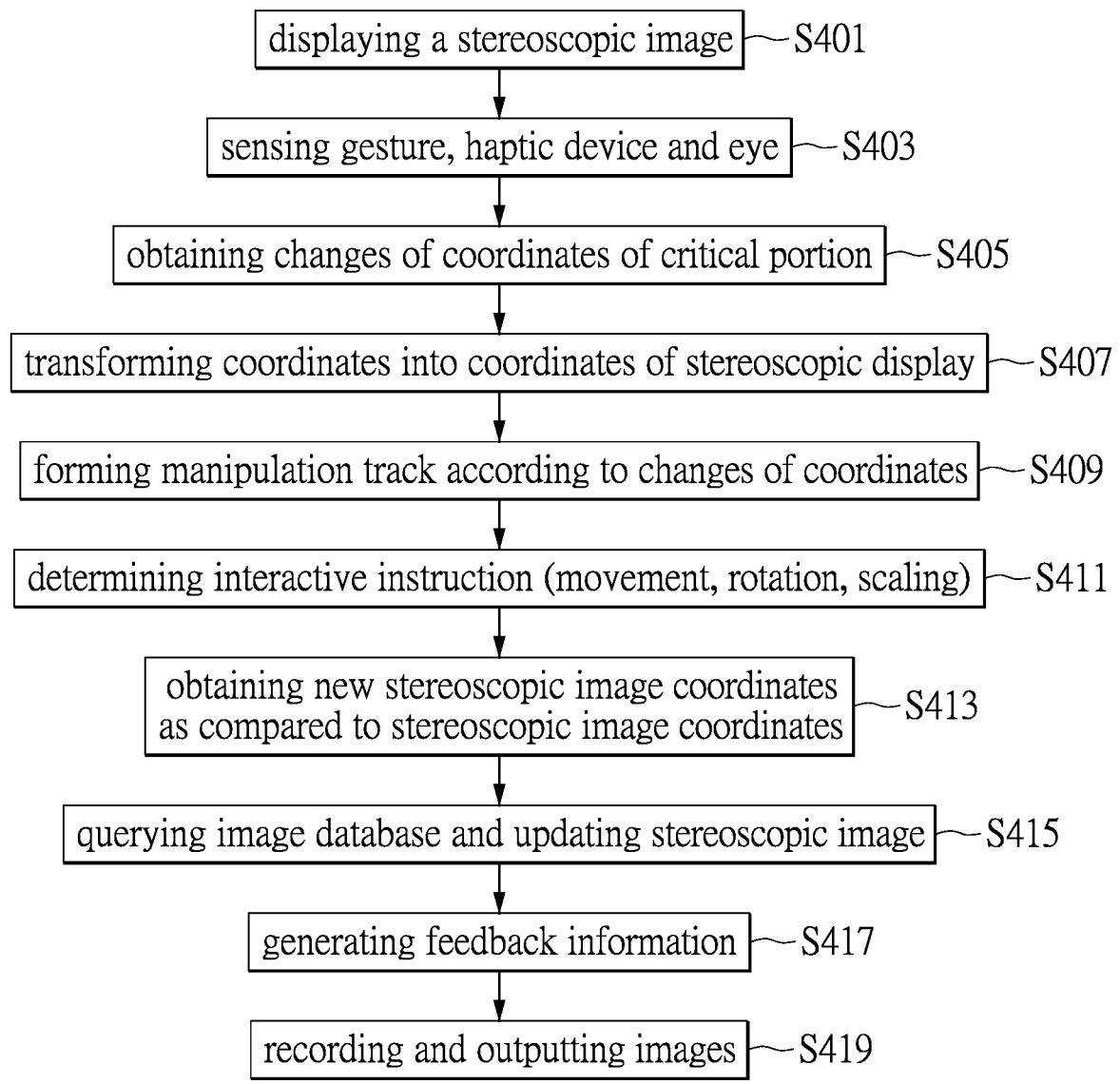
FIG. 4 is a flowchart illustrating operation of the interactive simulation system with a stereoscopic image according to one embodiment of the present disclosure.

Following the above-described system, reference is next made to FIG. 4, which is a flowchart illustrating a method for operating the interactive simulation system according to one embodiment of the present disclosure.

In the beginning, a stereoscopic image display firstly displays a stereoscopic image (step S401). Next, the user performs gestures on or uses a haptic device to manipulate the stereoscopic image. The sensors of the stereoscopic image display sense the gesture performed by the user or the action made by the haptic device so as to generate sensing data, including a position of the eye of the user (step S403). A behavior tracking technology is used to obtain the changes of coordinates of each of the critical portions of the stereoscopic image by tracking the gesture or the action performed on the stereoscopic image (step S405). If necessary, the changes of the coordinates can be transformed to a coordinate system of the stereoscopic image display (step S407), so that a manipulation track performed on the stereoscopic image can be formed according to the changes of coordinates (step S409).

In one embodiment of the present disclosure, the gesture sensor is used to sense the gesture performed on the stereoscopic image displayed by the stereoscopic image display so as to acquire the changes of the three-dimensional coordinates of some critical portions such as fingers, knuckles and palms of the user. The changes of the three-dimensional coordinates are formed by sensing the gesture by the gesture sensor for a period of time. If it is necessary, the coordinates in a coordinate system with respect to the gesture sensor can be transformed to the coordinate system of the stereoscopic image display. At the same coordinate system, the system can acknowledge the relationship between the interactive instruction generated by the gesture and the stereoscopic image.

After that, a processing circuit of the system determines the interactive instruction of minification, magnification, movement or rotation according to the manipulation track. With the haptic device for the medical use as an example, the haptic device can be used to perform an action of cutting, piercing into, pulling apart or trimming (step S411). After comparison to the stereoscopic image coordinates, a set of new coordinates with respect to the stereoscopic image to be updated can be obtained (step S413). After querying the image database, the stereoscopic image can be updated (step S415). The interaction can therefore be accomplished. Further, the interactive simulation system provides a feedback according to the gesture performed by the user or the action performed by the user with the haptic device. For example, the system can generate a sound with respect to the interactive instruction so as to prompt the state of the gesture performed by the user or generate a vibration feedback with a built-in vibrator of the haptic device for indicating the instant state while the user manipulates the haptic device (step S417).

For the purpose of teaching simulation, the track, while the user performs the gesture or uses the haptic device to manipulate the stereoscopic image, the various feedbacks and the changes of the stereoscopic image, can be recorded. A video can then be outputted, provided for the user to playback, and acts as the content of teaching simulation (step S419).

The interactive simulation system provides the image database such as the image database 400 of FIG. 4. According to the system framework illustrated in FIG. 1, the image database can be disposed in the stereoscopic image display, in the control host or in a cloud server. The image database is mainly used to store the stereoscopic image data, the attributes of the stereoscopic images and the corresponding risk information. The risk thresholds setting by the risk treatment module 409 are provided for the learner to avoid a certain level of damage in the teaching simulation.

Figure 5:
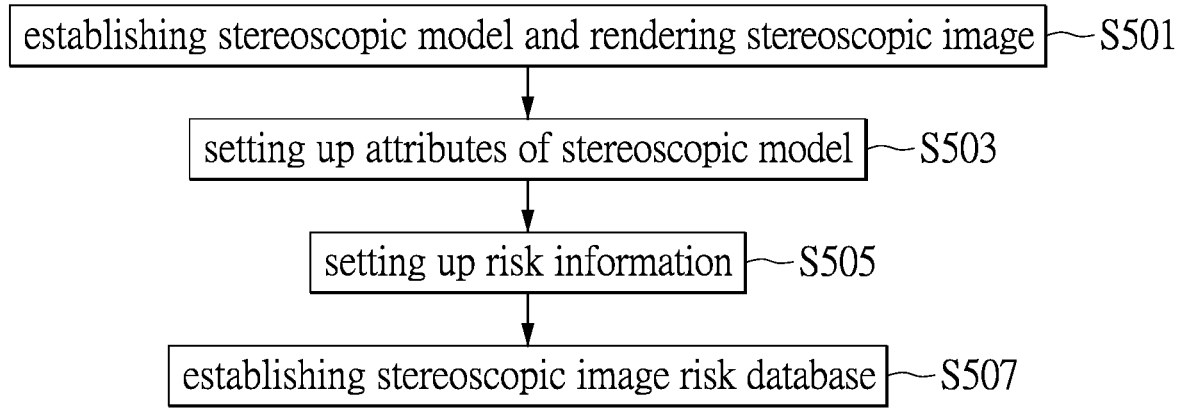
FIG. 5 is a flowchart illustrating a process of establishing risk information in the interactive simulation system with a stereoscopic image in one embodiment of the present disclosure.

Reference is made to FIG. 5, which is a flowchart illustrating a process of creating the risk threshold in the interactive simulation system according to one embodiment of the present disclosure.

The interactive simulation system establishes a stereoscopic model for a specific object, renders a stereoscopic image and generates stereoscopic image data (step S501). In the meantime, attributes of the stereoscopic model for the specific object can be created (step S503) and the related risk information can also be created and represented by the risk thresholds (step S505). A risk database for the stereoscopic image can be established (step S507). In one embodiment of the present disclosure, the risk information accompanied with the stereoscopic image data is stored in the image database.

In one further embodiment of the present disclosure, when the stereoscopic model is established, the attributes of the stereoscopic image mode are created based on the characteristics of the object. For example, the attributes of the stereoscopic model include stiffness of the object. The stiffness of the object indicates characteristics relating to deformation or breakage of the object when a force is applied thereto. The attributes of the stereoscopic model includes a damping efficient that is used to illustrate characteristics relating to a degree that the vibration gradually decreases as the object is stressed. The attributes of the stereoscopic model includes a friction that is used to illustrate a resistance when two objects are in contact. The attributes of the stereoscopic model includes a density that is used to determine a moving speed of the object when applying a force to the object. The attributes of the stereoscopic model includes parameters of displacement constraint across different objects, and the displacement constraint can be determined by according to an elasticity of the object. With a human tissue as an example, the parameters such as the stiffness, friction and resistance are determined for forming the feedback with respect to the gesture or the action performed by the haptic device. The risk thresholds can also be created at the same time for identifying the risky gesture and giving warning.

Figure 6:
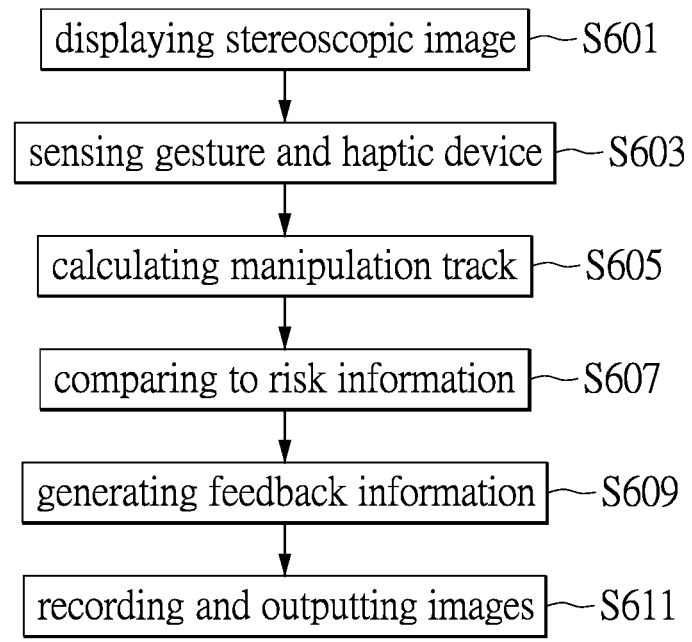
FIG. 6 is a flowchart illustrating a process of establishing a simulative learning video in the interactive simulation system with a stereoscopic image in one embodiment of the present disclosure.

According to the above embodiments of the present disclosure, when the interactive simulation system is in operation, the stereoscopic model is used to create a simulative learning video, reference is made to a flowchart shown in FIG. 6.

According to the flowchart shown in FIG. 6, a stereoscopic image display is used to display a stereoscopic image (step S601). An interactive sensor is used to sense gesture performed by a user or sense the action performed with the haptic device held by the user (step S603). A manipulation track can be calculated based on the sensing data (step S605). The risk information can be created based on the characteristics of an object (step S607), by which the system can generate feedback information (step S609). In one embodiment of the present disclosure, the risk information indicates risk thresholds specified to various gestures or the haptic devices with respect to the characteristics of the object (e.g., a human organ) to be simulated. Therefore, when the manipulation track is calculated according to the sensing data, the manipulation track is compared against a coordinate range displaying the stereoscopic image, and then compared against the risk thresholds so as to determine the risk according to an extent that the gestures or the actions performed by the haptic devices contact with the stereoscopic image. A feedback signal can be generated. Lastly, the various manipulations, tracks, changes of the stereoscopic image and a result of risk determination are recorded and a final stereoscopic image is outputted (step S611).

Figure 7:
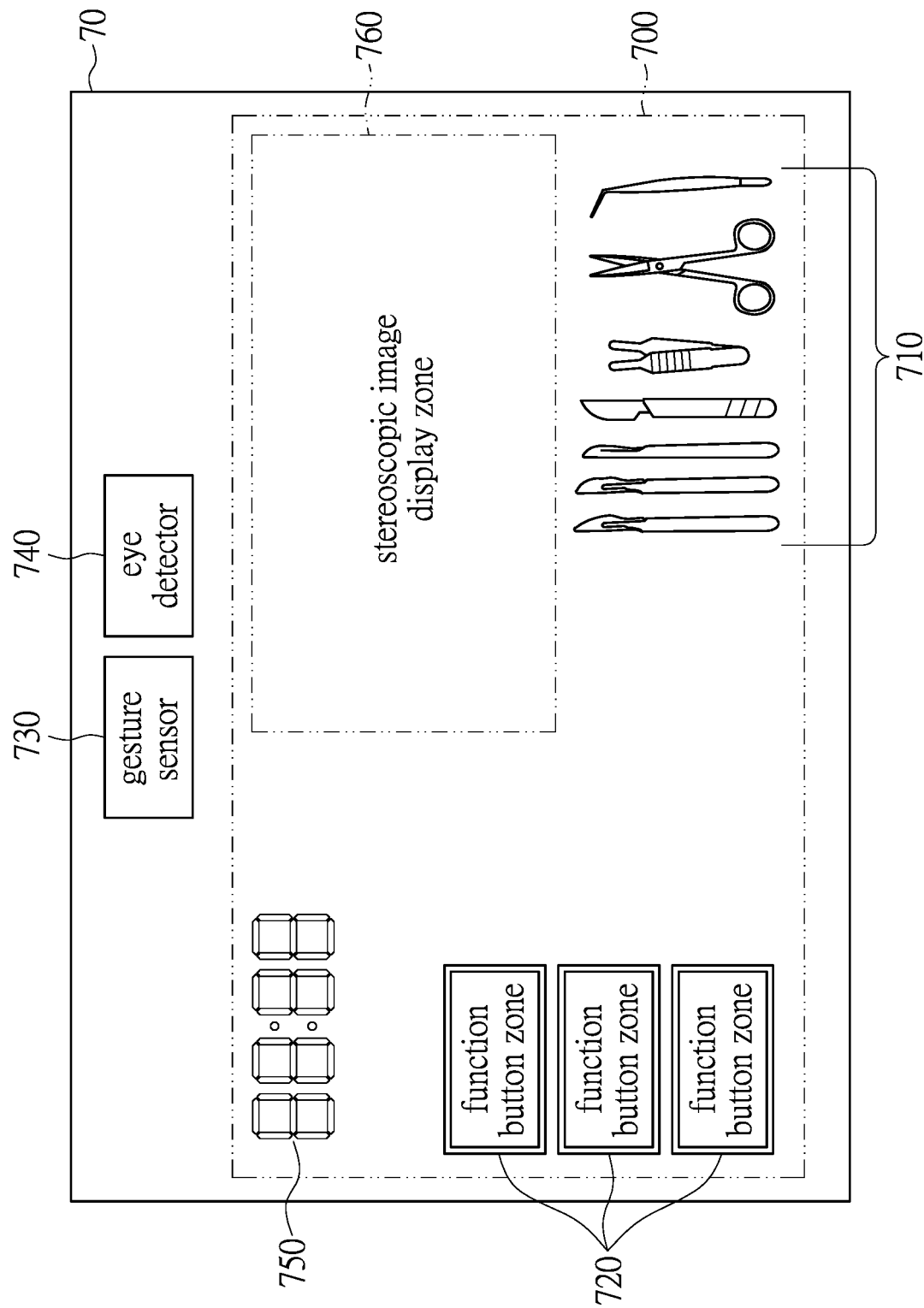
FIG. 7 is a schematic diagram depicting a stereoscopic image display of the interactive simulation system with a stereoscopic image according to one embodiment of the present disclosure.

Reference is made to FIG. 7, which is a schematic diagram depicting a stereoscopic image display of the interactive simulation system according to one embodiment of the present disclosure.

A stereoscopic image display panel 70 is schematically shown in the diagram. The content to be displayed on the stereoscopic image display panel 70 is a top layer that faces a user of a stereoscopic image display. A gesture sensor 730 and an eye detector 740 are included in the stereoscopic image display panel 70. An image display zone 700 is arranged on the stereoscopic image display panel 70. A floating stereoscopic image is shown through a backlight, optical elements and the stereoscopic image display panel 70. The stereoscopic image display panel 70 can display various selectable haptic devices and functional interfaces that can be simulated by software.

According to one embodiment of the present disclosure, the stereoscopic image display panel 70 is configured to provide a haptic device zone 710. In addition to the haptic device that the user holds to manipulate the stereoscopic image, options having various virtual haptic devices are shown on the image display zone 700. Each of the options indicates a specific type of the haptic device that has its own attributes. For example, for medical teaching simulation, the haptic device zone 710 provides various virtual tools for surgery. When the user selects one of the virtual haptic devices, the system relies on the user's handheld haptic device to determine a manipulation instruction. The stereoscopic image display panel 70 further provides a function button zone 720 that provides various function buttons that can be a physical interface or a software-implemented manipulation interface. The function buttons allow the user to set up a shortcut function button according to a requirement. The stereoscopic image display panel 70 also provides a stereoscopic image display zone 760 that is used to display a floating stereoscopic image, and a time display zone 750.

Figure 8:
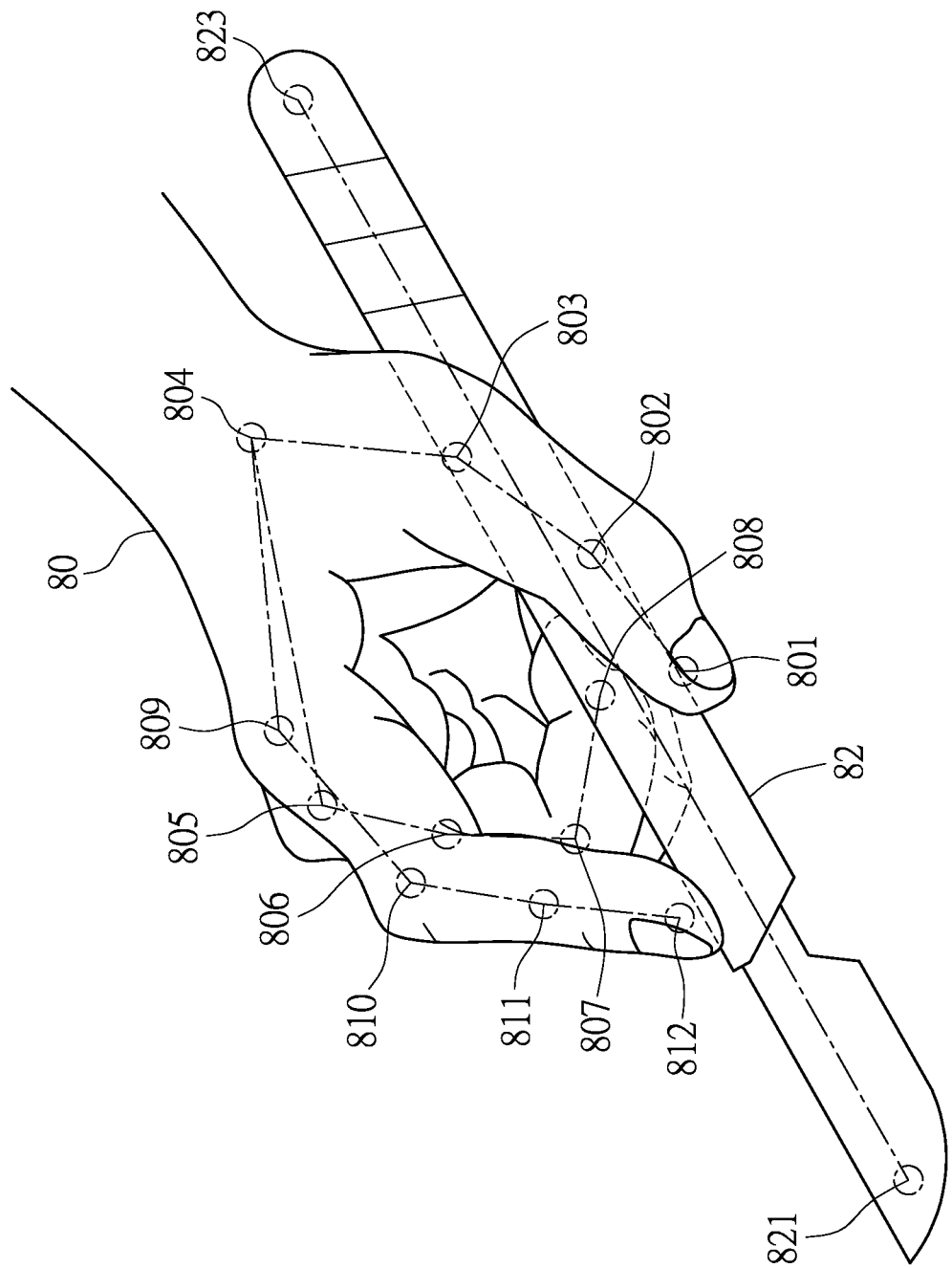
FIG. 8 is a schematic diagram depicting an exemplary example of sensing a gesture and a haptic device in the interactive simulation system with a stereoscopic image according to one embodiment of the present disclosure.

Next, reference is made to FIG. 8, which is a schematic diagram illustrating that an interactive simulation system senses a gesture or a haptic device in one embodiment of the present disclosure. An image of a hand 80 that holds a stick-shaped haptic device 82 is shown on the diagram. The interactive simulation system includes a gesture sensor that is able to acquire multiple gesture sensing points 801 to 812 of the hand 80, and the multiple gesture sensing points 801 to 812 can be acquired by an optical detection or an image recognition technology.

The gesture sensing points 801 to 812 are used to reflect the action of some critical portions of the gesture performed by the users. The gesture sensor senses changes of the coordinates from the gesture sensing points 801 to 812 so as to determine the gesture. Alternatively, multiple critical haptic device sensing points are defined on the haptic device 82. For example, only two critical haptic device sensing points 821 and 823 are required on the stick-shaped haptic device 82, and the gesture sensor can rely on the changes of coordinates of the two haptic device sensing points 821 and 823 to depict a manipulation track.

Figure 9:
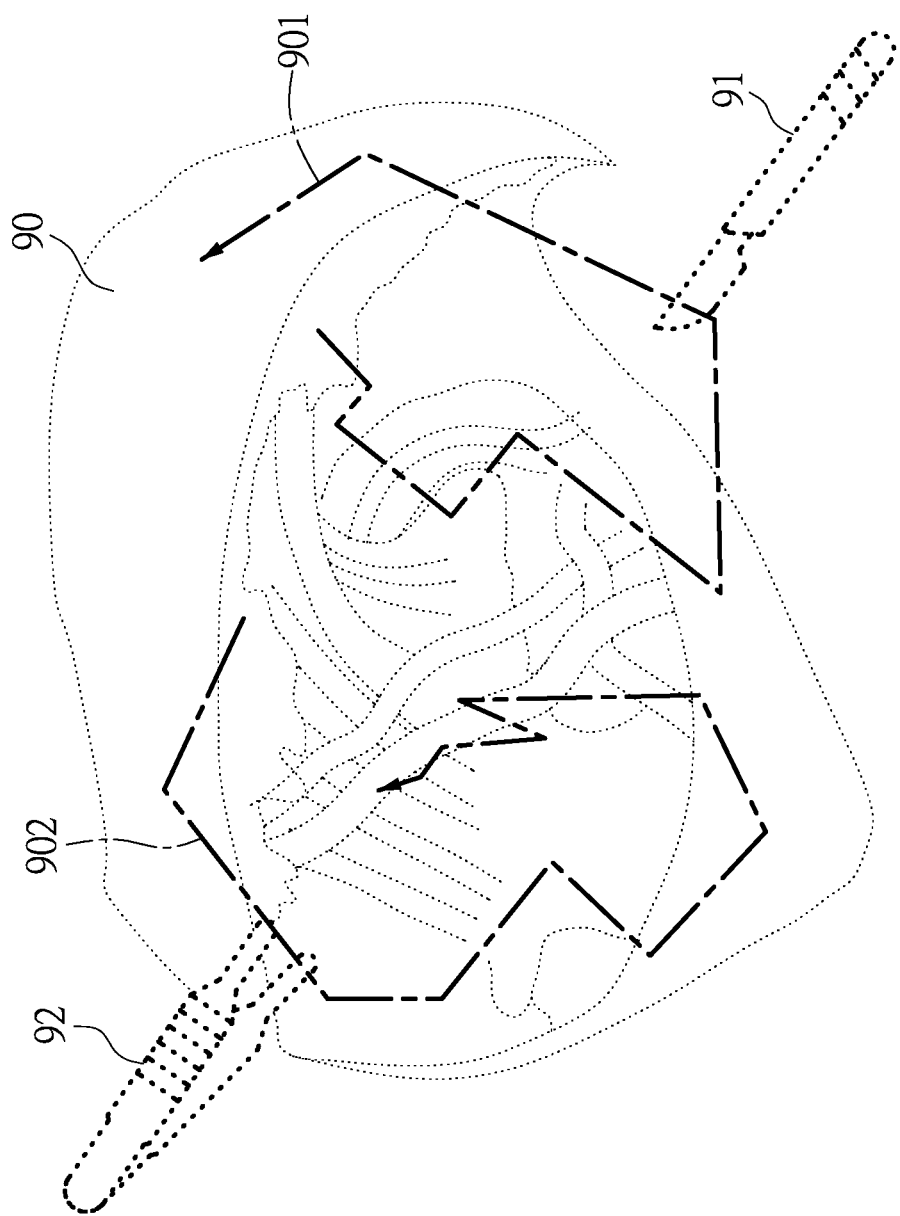
FIG. 9 is a schematic diagram illustrating a process of obtaining a manipulation track in the interactive simulation system with a stereoscopic image according to one embodiment of the present disclosure.

Reference is made to FIG. 9, which is a schematic diagram depicting two manipulation tracks acquired by the interactive simulation system with a stereoscopic image according to one embodiment of the present disclosure. A three-dimensional object to be manipulated 90 is shown in the diagram. The three-dimensional object can be a stereoscopic image of a human organ for surgical simulation. In the diagram, a user manipulates a first haptic device 91 and a second haptic device 92 at the same time. Based on the exemplary example shown in FIG. 8, the interactive simulation system respectively calculates the two manipulation tracks (i.e., a first manipulation track 901 and a second manipulation track 902) according to changes of coordinates of the sensing points of the first haptic device 91 and the second haptic device 92 that are held by two hands of the user.

Figure 10:
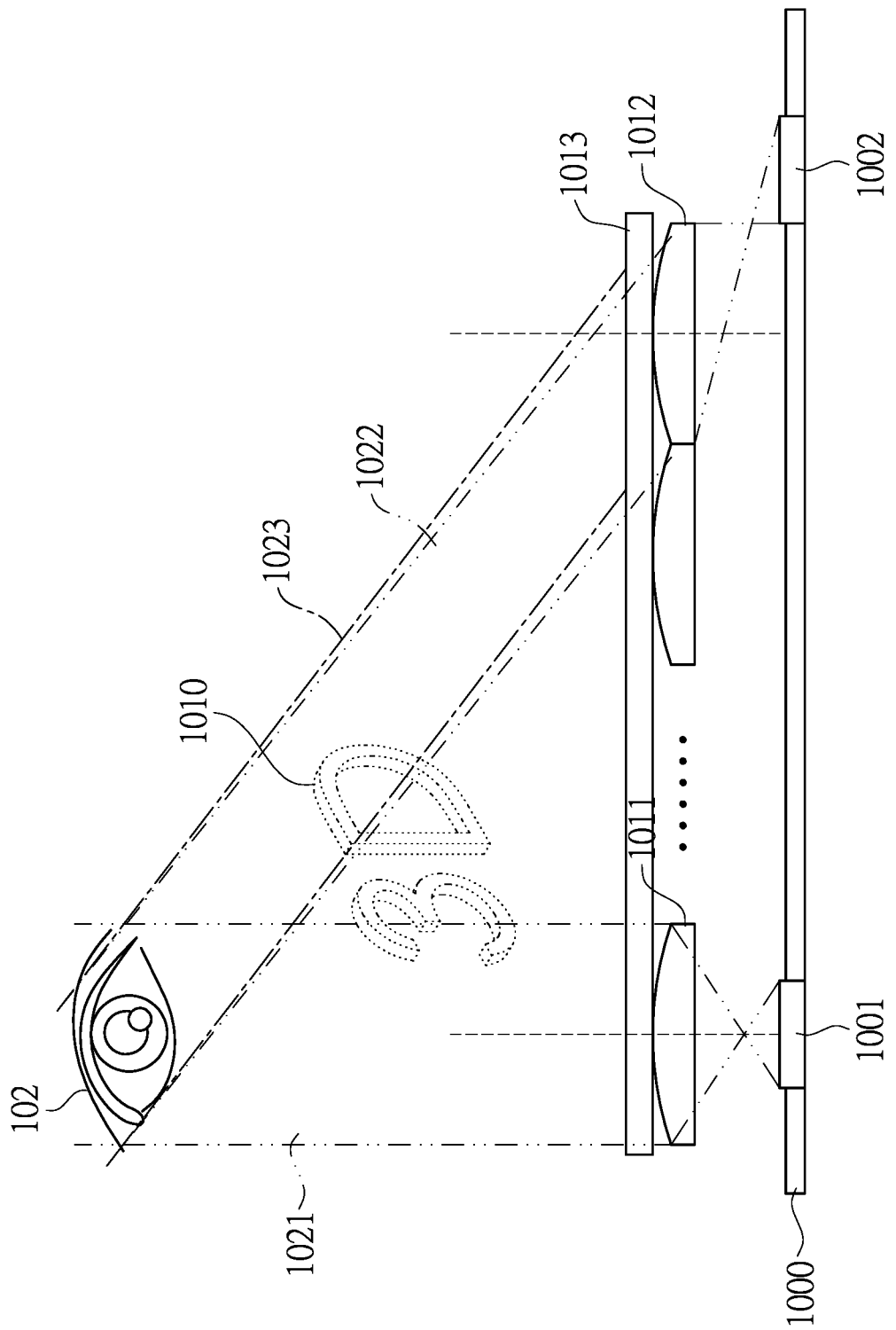
FIG. 10 is a schematic diagram depicting an eye being tracked in one embodiment of the present disclosure.

In the interactive simulation system, the stereoscopic image is updated not only based on the gesture performed on the stereoscopic image or the action performed by the haptic device over the stereoscopic image, but also an angle and position of the stereoscopic image are updated based on the viewing position of the eye. Therefore, the viewing experience of the user can be improved. FIG. 10 is a schematic diagram illustrating an approach of tracking one of the eyes of the user by a mechanical design of a stereoscopic image display panel according to one embodiment of the present disclosure. A ray tracking technology is incorporated in the system so as to track the eye of the user for forming a floating stereoscopic image above the display panel. The display panel of the stereoscopic image display is used to display an image that is designed to be multiple unit images arranged in an array. The multiple unit images form an integrated image that is displayed by the display panel. Each of the unit images is projected and focused on a space above the display panel through a corresponding optical element, e.g., a lens. The floating real image is accordingly displayed.

According to an exemplary example of FIG. 10, a user's eye 102 that views a stereoscopic image 1010 is shown above a stereoscopic image display. The stereoscopic image 1010 is projected on a stereoscopic space through a display panel 1000 that is composed of lenses that are arranged in an array in a multi-optics module of the stereoscopic image display. In the present example, a floating stereoscopic image 1010 is shown as a three-dimensional character "3D." For displaying a stereoscopic image, a stereoscopic image data can be obtained from a stereoscopic image source. A reference image corresponding to the stereoscopic image 1010 of FIG. 10 is created. The image information of the reference image includes colors and three-dimensional information that are used to illustrate the stereoscopic image 1010. Every pixel in the stereoscopic space has a set of coordinates (x, y, z) and a chromatic value. The image information of the reference image can include a plane image and a corresponding depth map. Afterwards, eye positions of the user can be predetermined or an actual eye positions of the user can be detected by an eye-detection technology, and physical information between the eye and the multi-optics module can be obtained. The system can acquire the physical information of the multi-optics elements. The physical information includes size and property of the optical element, e.g., lenses, the coordinates, size and refraction of a single lens or multiple lenses, the spatial position that is projected with an optical element, a spatial relationship (e.g., a distance) between the optical elements and the display panel, a projecting position and a spatial relationship of each of the optical elements.

It should be noted that, for reproducing the stereoscopic image, a planar coordinates can be used with a depth value (z value) of each of the pixels of a plane picture according to the depth map so as to reproduce the coordinates (x, y, z) for illustrating the stereoscopic image. Further, a chromatic value of each of the pixels can also be used to reproduce the accurate colors and correct spatial position of the stereoscopic image. After that, the system relies on the stereoscopic image data, the position of the eye of the user, and the position projecting the stereoscopic image to create the reference image. The reference image is used to represent the three-dimensional coordinates and the chromatic value of the stereoscopic image. According to one embodiment of the present disclosure, the original stereoscopic image can be transformed to the reference image via a coordinate transformation, in which a set of transformation parameters can be calculated based on a coordinate transformation algorithm.

While the position of the eye of the user is obtained, ray tracking information between the position of the eye and every lens unit can be established. As shown in the diagram, the ray tracking information among the eye 102, each of the lens units (1011, 1012) and the corresponding unit image (1021, 1022) is established. In one embodiment of the present disclosure, a region of visibility (RoV) can be formed according to a rim position of the eye 102 and a rim position of every lens unit of the multi-optics module. Each of the regions of visibility can cover a certain portion of the stereoscopic image 1010. For example, in FIG. 10, a first visible range 1021 is formed based on a ray track formed in between the eye 102 and a first lens unit 1011, a second visible range 1022 is formed based on a ray track between the eye 102 and a second lens unit 1012, and so on. Accordingly, multiple visible ranges can be formed based on the position of the eye 102 and every lens unit of the multi-optics module. Each of the visible ranges covers a certain portion of the stereoscopic image 1010. The multiple lens units (1001, 1002) with various contents and sizes can be correspondingly calculated.

In certain examples of the disclosure, the first visible range 1021, the second visible range 1022, the optical characteristics (e.g., a thickness, an area, a surface curvature and a refractive index of each of the lenses) of the corresponding first lens unit 1011 and second lens unit 1012, and a distance from the display panel are referred to so as to calculate the first unit image 1001 and the second unit image 1002. Lastly, the information of multiple ray tracks, multiple lens units and the reference image record the image information in the stereoscopic space. The image information of the stereoscopic image 1010 in each of the visible ranges in the stereoscopic space includes the position of each of the pixels displayed on the display panel and can be recorded in a memory. Specifically, the memory records the pixel information including the three-dimensional coordinates and chromatic values) of the stereoscopic image 1010 in the stereoscopic space and the pixel information can render the pixel values projected on the display panel through the multi-optics module.

Further, according to the schematic diagram depicting the structure of the stereoscopic display in view of FIG. 2, in addition to a lens assembly including the lens 1011 and 1012 in the multi-optics module, the multi-optics module also includes an optical layer 1013 having a structure with off-axis optical property. The optical layer 1013 can be used to adjust a light path from the display panel 1000 to the eye 102. In an exemplary example shown in the diagram, the second visible range 1022 can be fine-tuned to a third visible range 1023 through the optical layer 1013. It should be noted that the second visible range 1022 is formed without the optical layer 1013 or when the optical layer 1013 is disabled. Similarly, when the interactive simulation system adjusts the light path to be emitted to the eye 102 through the optical layer 1013, the lens assembly including the first lens unit 1011 and the second lens unit 1012, the characteristics of the optical layer 1013, and the position of the display panel should be taken into account for rendering the content of the corresponding unit image.

In one further embodiment of the present disclosure, the stereoscopic image data is generated based on a coordinate transformation function. The coordinate transformation function between the original stereoscopic image and the reference image can be established. An algorithm and the coordinate transformation function are used to render each of the unit images corresponding to each of the lens units from the reference image according to the characteristics of hardware such as the physical property of the optical elements. The position of the size of each of the unit images may be different since the eye-tracking result with respect to each of the unit images corresponding to each of the lens units is different. The multiple unit images are then rendered. The multiple unit images form an integrated image of the stereoscopic image 1010 that is adapted to the position of the eye of the user. Afterwards, the stereoscopic image 1010 that is adapted to the position of the eye can still be reproduced continuously based on any change of the position of the eye 102.

FIG. 10 also shows the unit images that have different positions, sizes and contents corresponding to the lens unit at different positions. The change of the position of the eye 102 causes the change of the eye-tracking result, such that the integrated image is also changed.

The interactive simulation system relies on the eye-tracking technology to detect the position of the eye of the user so as to render an eye-adaptive stereoscopic image. The eye-tracking technology is used to acquire visible parameters including three-dimensional coordinates of the eye, a viewing angle range and a speed of movement when the user watches the stereoscopic image. The three-dimensional coordinates, the viewing angle range and the speed of movement of the eye can be combined with the gesture or the action of the haptic device for forming the manipulation track so as to acquire a contour of the user's hand or the haptic device in order to render the stereoscopic image. The information form the optimal parameters to render the stereoscopic image when all the visible range, the viewing angle range, the relative positions of the elements in the system, the speed of the movement of the object, and the interaction with the object are taken into consideration.

Figure 11:
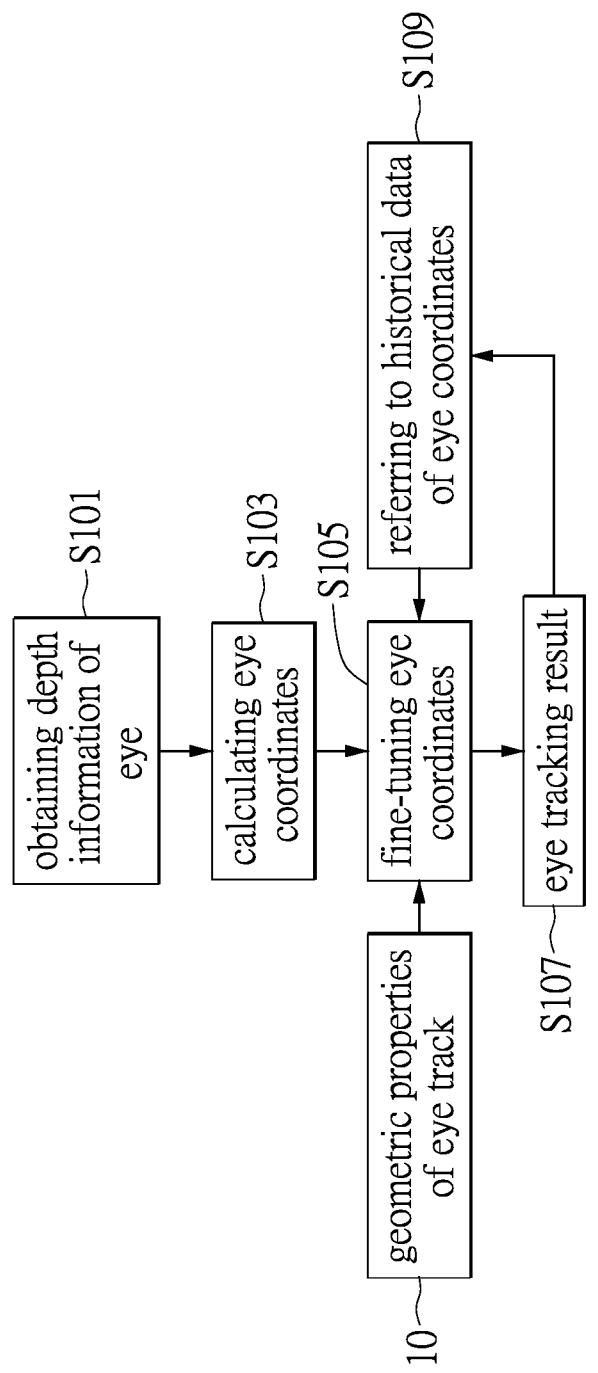
FIG. 11 is a flowchart illustrating a process of tracking the eye in one embodiment of the present disclosure.

Reference is made to FIG. 11, which is a flowchart illustrating a process of the eye-tracking technology according to one embodiment of the present disclosure. When tracking the eye of the user, the depth information of the eye is acquired firstly (step S101). The three-dimensional coordinates of the eye can be calculated according to a result of eye detection (step S103). Further, the three-dimensional coordinates of the eye can be fine-tuned according to geometric properties 10 of the eye trajectory (step S105). Simultaneously, the historical data of the three-dimensional coordinates of the eye stored in the system are referred to (step S109). Because the geometric properties of the eye trajectory are stable and will not move randomly, and the speed of the movement has a certain limit, the eye-tracking result can therefore be confined within a desired range. In the above step S109, the three-dimensional coordinates of the eye can be fine-tuned according to the geometric properties of the eye trajectory and the historical data of the three-dimensional coordinates of the eye. The eye-tracking result can be obtained (step S107). The eye-tracking result also forms a part of the historical data of the three-dimensional coordinates of the eye (step S109) and becomes the reference for next eye tracking.

In conclusion, according to the above embodiments of the interactive simulation system and the method for operating the same, the system provides the stereoscopic image display that can be a standalone device having a built-in control module or externally connected with a control host. The system stores, calculates and displays the stereoscopic image data. The system achieves the purpose of simulating the operation of a specific object, e.g., teaching simulation, with the gesture sensor and the various haptic devices.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An interactive simulation system with a stereoscopic image, comprising:
    a stereoscopic image display used to display the stereoscopic image, wherein the stereoscopic image display includes an interactive sensor that is used to sense a gesture of a user or an action generated by manipulating a haptic device; and a control host built in or externally connected to the stereoscopic image display, wherein the control host is used to interpret the gesture of the user or the action generated by manipulating the haptic device, so as to obtain an interactive instruction performed on the stereoscopic image;

wherein, when the interactive simulation system is in operation, the stereoscopic image display is used to display the stereoscopic image, and the interactive sensor is used to sense the gesture or the action; and whether or not any risk is caused by the gesture or the action generated by manipulating the haptic device is determined according to a risk threshold when the user performs the gesture or manipulates the haptic device on the stereoscopic image for generating sensing data, so as to determine changes of coordinates of the gesture or the action; wherein a manipulation track is formed based on the changes of the coordinates, the interactive instruction is determined, and the stereoscopic image is updated according to the interactive instruction;

wherein the risk threshold is set by referring to attributes and risk information of the stereoscopic image and attributes of a stereoscopic model specified to an object to be manipulated based on a risk management indicating logical interactions of the interactive simulation system, and the interactive simulation system relies on the risk management to prompt the user when engaging in any dangerous action that crosses a boundary based on a well-defined forbidden zone.

2. The interactive simulation system according to claim 1, wherein, when the interactive simulation system is in operation, the control host relies on the interactive instruction to query an image database in real time for acquiring stereoscopic image data that corresponds to different ones of the interactive instruction, and updates the stereoscopic image to be displayed on the stereoscopic image display.

3. The interactive simulation system according to claim 1, wherein the interactive sensor includes a gesture sensor that is used to sense the gesture of the user and the action generated by manipulating the haptic device; wherein the sensing data generated by the gesture sensor refers to three-dimensional coordinate variations, and is formed into the interactive instruction after being processed by the control host.

4. The interactive simulation system according to claim 1, wherein an action sensor is built in the haptic device, and the sensing data generated by the action sensor refers to three-dimensional coordinate variations of the haptic device in a stereoscopic space, and is formed into the interactive instruction after being processed by the control host.

5. The interactive simulation system according to claim 1, wherein the interactive sensor includes an eye detector that simultaneously detects eye positions of the user and sensing the gesture of the user or the action generated by manipulating the haptic device, and the stereoscopic image display updates the stereoscopic image in real time according to the eye positions.

6. The interactive simulation system according to claim 5, wherein the eye detector is capable of being turned on or turned off, wherein, when the eye detector is turned on to start detecting the eye positions of the user, the stereoscopic image display updates the stereoscopic image in real time according to the eye positions, and a definition of the stereoscopic image updated when the eye detector is turned on is higher than a definition of the stereoscopic image obtained when the eye detector is turned off and eyes of the user are not detected.

7. The interactive simulation system according to claim 6, wherein, when the interactive simulation system is in operation, the control host relies on the interactive instruction to query an image database in real time for acquiring stereoscopic image data that corresponds to different ones of the interactive instruction, and updates the stereoscopic image to be displayed on the stereoscopic image display.

8. The interactive simulation system according to claim 7, wherein the interactive instruction is configured to minify, magnify, move or rotate the stereoscopic image, or to cut, pierce into, pull apart or trim by using the haptic device.

9. The interactive simulation system according to claim 7, wherein the image database records a correlation between the stereoscopic image data and an annotation that includes a content of the annotation and a spatial position.

10. The interactive simulation system according to claim 7, wherein the image database stores the stereoscopic image data, and the attributes and the risk information of the stereoscopic image.

11. A method for operating an interactive simulation system with a stereoscopic image, comprising:

using a stereoscopic image display to display a stereoscopic image;

using an interactive sensor to sense a gesture performed by a user who manipulates the stereoscopic image or an action of the user manipulating a haptic device, so as to generate sensing data;

determining changes of coordinates of the gesture or the action generated by manipulating the haptic device, so as to form a manipulation track based on the changes of the coordinates;

determining an interactive instruction according to the manipulation track; and updating the stereoscopic image according to the interactive instruction;

when the user performs the gesture or manipulates the haptic device on the stereoscopic image, whether or not any risk is caused by the gesture or the action generated by manipulating the haptic device is determined according to a risk threshold that is set by referring to attributes and risk information of the stereoscopic image and attributes of a stereoscopic model specified to an object to be manipulated based on a risk management indicating logical interactions of the interactive simulation system, and the interactive simulation system relies on the risk management to prompt the user when engaging in any dangerous action that crosses a boundary based on a well-defined forbidden zone.

12. The method according to claim 11, wherein, when the interactive simulation system is in operation, an image database is queried in real time according to the interactive instruction, so that stereoscopic image data that corresponds to different ones of the interactive instruction is acquired, and the stereoscopic image to be displayed on the stereoscopic image display is updated.

13. The method according to claim 11, wherein, during sensing of the gesture of the user or the action generated by manipulating the haptic device, eye positions of the user are simultaneously detected, so that the stereoscopic image display updates the stereoscopic image in real time according to the eye positions, and the obtained stereoscopic image has a higher definition as compared to not detecting the eye positions of the user.

14. The method according to claim 13, wherein an eye-tracking technology is used to detect the eye positions of the user for obtaining three-dimensional coordinates, a viewing angle range and a moving speed of eyes of the user, and the manipulation track formed by the gesture or the action generated by manipulating the haptic device is further combined for acquiring contours of a hand of the user and the haptic device, so as to render the stereoscopic image.

15. The method according to claim 14, wherein the eye-tracking technology includes steps of:
    obtaining depth information of the eye;
    calculating the three-dimensional coordinates of the eye;
    fine-tuning the three-dimensional coordinates of the eye based on geometric properties of an eye trajectory; and
    obtaining an eye-tracking result by referring to historical data of the three-dimensional coordinates of the eye.

16. The method according to claim 11, wherein, when the interactive simulation system is in operation, a control host built in or externally connected to the stereoscopic image display relies on the interactive instruction to query an image database in real time for acquiring stereoscopic image data corresponding to the interactive instruction, and updates the stereoscopic image to be displayed on the stereoscopic image display.

17. The method according to claim 16, wherein the interactive instruction is configured to minify, magnify, move or rotate the stereoscopic image, or to cut, pierce into, pull apart or trim with the haptic device.

18. The method according to claim 17, wherein the image database records correlation between the stereoscopic image data and an annotation that includes content of the annotation and a spatial position.

\* \* \* \* \*